April 11, 1967 KOKICHI JIN 3,313,354
APPARATUS FOR AUTOMATICALLY CONTROLLING THE DEPTH
OF SOIL TILLED BY AGRICULTURAL TRACTORS
Filed Nov. 4, 1964 3 Sheets-Sheet 1

Inventor
Kokichi Jin
By: Stevens, Davis, Miller & Mosher
ATTORNEYS

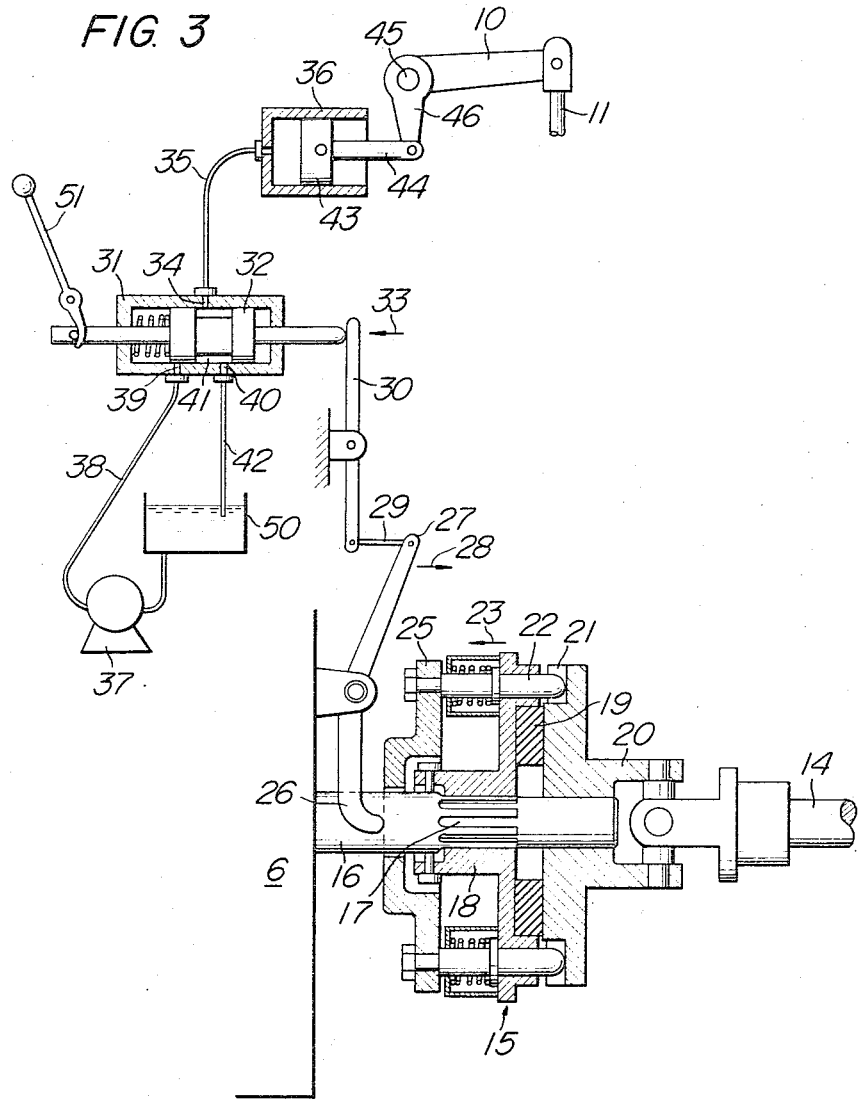

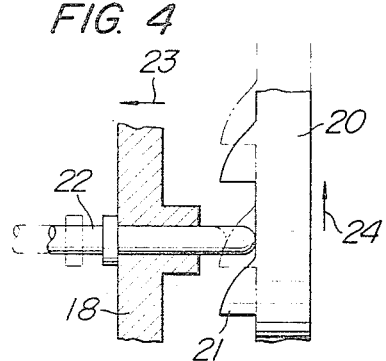
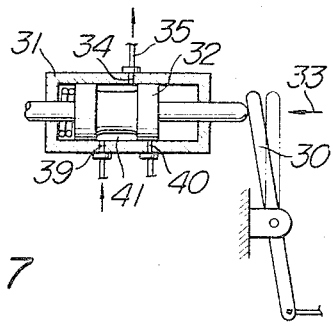
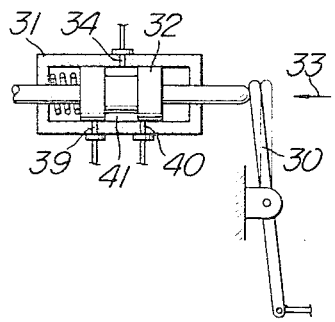
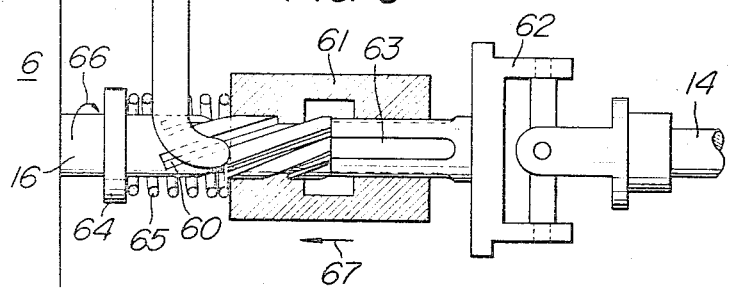

United States Patent Office 3,313,354
Patented Apr. 11, 1967

3,313,354
APPARATUS FOR AUTOMATICALLY CONTROLLING THE DEPTH OF SOIL TILLED BY AGRICULTURAL TRACTORS
Kokichi Jin, Ibaragi-shi, Japan, assignor to Tadao Yamaoka, Ashiya-shi, Japan
Filed Nov. 4, 1964, Ser. No. 408,859
Claims priority, application Japan, June 22, 1964, 39/35,182
3 Claims. (Cl. 172—12)

The present invention relates to agricultural tractors having rotary implements fitted thereto for tilling a farm and more particularly to apparatus for automatically controlling the depth of soil tilled by such rotary implements.

In a tilling operation with a rotary implement fitted to an agricultural tractor, the depth to be tilled by the implement is generally made as great as possible as far as the output of the tractor engine permits. The tractor engine operating under such an extreme condition may be overloaded when, for example, the implement encounters hard portions of soil during operation and may sometimes be rendered inoperative.

It is therefore the primary object of the present invention to provide an apparatus adapted to be incorporated in an agricultural tractor, which apparatus is operative in response to an overload of the tractor engine to automatically lift a rotary implement fitted to the tractor for thereby reducing the load of the engine.

According to this invention, there is provided, in an agricultural tractor provided with a rotary implement driven by the power transmitted from the tractor engine through a power take-off shaft and hydraulically operated means for causing vertical movement of said rotary implement, an apparatus for automatically controlling the depth being tilled by said tractor, comprising controller means disposed in the power transmission path from the tractor engine to said rotary implement and operative in response to any variation of the load applied to the power take-off shaft, control valve means for controlling the operation of said hydraulically operated means, and means to transmit the operation of said controller means to said control valve means.

There are other objects and particularities of the present invention which will become obvious from the following description with reference to the accompanying drawings, in which:

FIG. 3 is a diagrammatic explanatory view showing an arrangement of the apparatus, with the controller, a control cylinder and a ram cylinder shown in axial section;

FIG. 4 is a sectional view of parts of the controller, showing a manner of operation thereof;

FIG. 5 is a sectional view of the control cylinder with a valve member therein in one operative position;

FIG. 6 is an axial sectional view of another form of the controller of FIG. 3; and FIG. 7 is a view similar to FIG. 5, but showing the valve member in the control cylinder in another operative position.

Figure 1:
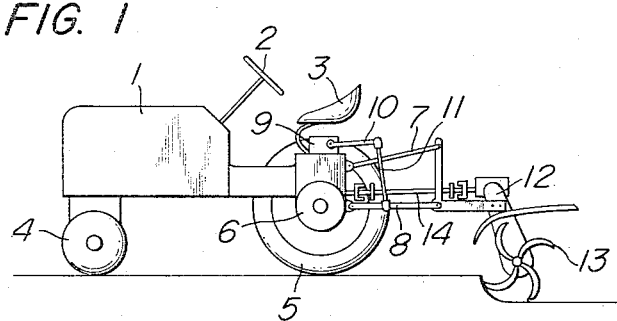
FIG. 1 is a side elevational view of a tractor tilling a farm with a rotary implement fitted thereto.
Figure 2:
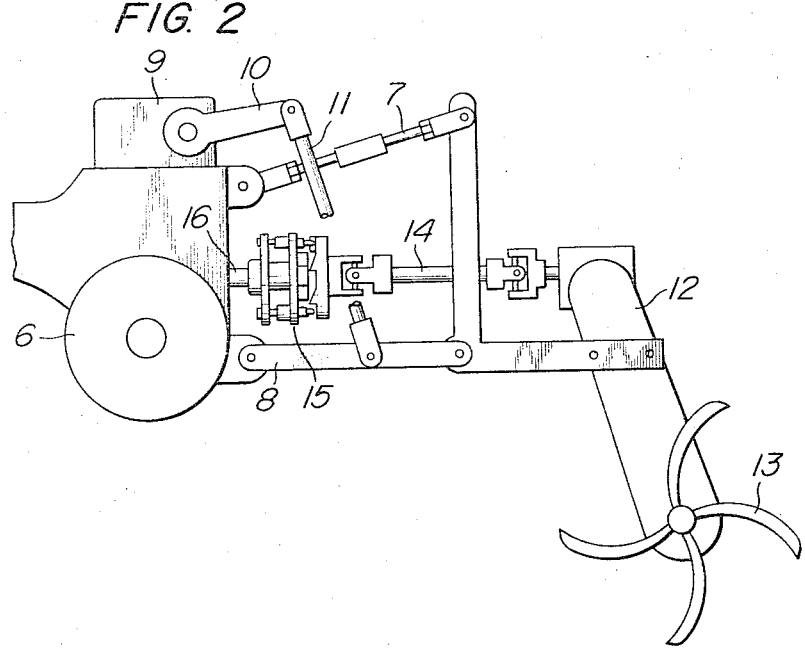
FIG. 2 is a somewhat enlarged side elevational view of parts of the tractor in FIG. 1, showing a controller in an apparatus of the invention mounted on the power take-off shaft of the tractor engine.

Referring now to FIG. 1, there is shown a tractor in which reference numerals 1, 2 and 3, denote an engine, a steering handle and a driver's seat, respectively. The tractor travels on front and rear wheels 4 and 5 and has a gear box 6 at the rear part thereof. A rotary implement is fitted to the tractor by means of upper and lower rods 7 and 8 forming a three point supporting system. The rotary implement is arranged to be moved upwardly and downwardly by a hydraulic system generally indicated at 9 through arms 10 and connecting rods 11. Power from the tractor engine is transmitted through a power take-off shaft 16 and a power transmission shaft 14 to a transmission gearing 12 to drive rotary claws 13.

According to this invention, a controller generally indicated at 15 is mounted on the end of the power take-off shaft 16 to connect the same with the power transmission shaft 14. The power take-off shaft 16 is splined at a portion adjacent its end as at 17. The controller 15 includes a disc-like member 18 which is mounted on this splined portion 17 for spline engagement therewith, as shown in FIG. 3. An annular resilient member 19 is coaxially fixed to the disc-like member 18, and a disc-like member 20 is loosely mounted on the shaft 16 and is fixed to the resilient member 19 in a manner that the resilient member 19 is firmly held between the members 18 and 20, the latter member being operatively connected with the shaft 14. Therefore, the driving power is transmitted through the power take-off shaft 16, the disc-like member 18, the resilient member 19, the disc-like member 20, and the transmission shaft 14 to the rotary implement. The inner peripheral wall of the disc-like member 20 is suitably recessed at suitable intervals to provide cam-like projections 21 as best shown in FIG. 4. Adjacent the periphery of the disc-like member 18, there are provided axial bores in which pins 22 are loosely fitted and normally urged by means such as springs towards the disc-like member 20 so that one end of each pin 22 may normally be positioned between the adjacent cam-like projections 21. The other ends of the pins 22 are firmly fixed in a disc-like member 25 which is axially slidable on the shaft 16.

The resilient member 19 is subjected to torsion when the driving power is transmitted therethrough so that the disc-like member 20 is displaced relative to the disc-like member 18 in a direction as shown by arrow 24 in FIG. 4. Therefore, the pins 22 loosely fitted in the disc-like member 18 are urged by the cam-like projections 21 in a direction shown by arrow 23. An amount of torsion of the resilient member 19 increases and decreases depending upon the magnitude of the driving power being transmitted. Thus, the greater driving power will cause a correspondingly greater movement of the pins 22 away from the disc-like member 20. As the pins 22 are urged in the direction of arrow 23, the disc-like member 25 carrying therein the pins 22 is also urged in the same direction.

This axial displacement of the disc-like member 25 urges the bifurcated ends of a fork lever 26 pivotally supported by the tractor body and thus the other end 27 of the lever 26 is urged in a direction of arrow 28. This movement is successively transmitted through a rod 29 to a lever 30, the free end of which urges a spool valve member 32 in a control cylinder 31 disposed in the hydraulic system in a direction of arrow 33. The interior of the control cylinder 31 is arranged to communicate with a ram cylinder 36 in the hydraulic system by way of a port 34 and a conduit 35. Fluid supply to the hydraulic system is effected by a hydraulic pump 37 which is connected to a port 39 of the control cylinder 31 by way of a conduit 38. When the valve member 32 in the cylinder 31 takes a position as shown in FIG. 3, the port 39 is closed by the valve member 32 so that there is no flow of pressure fluid towards the ram cylinder 36, while the port 34 is allowed to freely communicate with a port 40 through a space 41 defined by the valve member 32 and the inside wall of the cylinder 31. With this position of the valve member 32, there is free communication between the ram cylinder 36 and a fluid reservoir 50 by way of the conduit 35, the port 34, the space 41, the port 40 and a conduit 42, and the fluid pressure does not act on a ram piston 43 in the cylinder 36. Therefore, the rotary implement connected with the ram piston 43 through a piston rod 44, an arm 46 pivotally mounted on a shaft 45, the arms 10 and the connecting rods 11 is in its lower position.

When the valve member 32 is forced in the direction of arrow 33 as described in the foregoing, the valve member 32 takes a position as shown in FIG. 5 and permits communication between the ports 34 and 39 of the control cylinder 31. Thus, the pressure fluid is admitted into the ram cylinder 36 by way of the conduit 35 to urge the ram piston 43. This movement of the ram piston 43. causes upward movement of the connecting rods 11 through the piston rod 44, the arm 46 and the arms 10 to cause upward movement of the rotary implement. By the upward movement of the rotary implement, the load on the shaft 16 is reduced and the amount of torsion of the resilient member 19 is also reduced correspondingly so that the disc-like member 20 resumes its original position relative to the position of the disc-like member 18. Then, the pins 22 and the aforementioned mechanism actuated by the movement of the pins 22 are all restored to their original positions and the implement is again lowered to continue its tilling operation. Means such as a lever 51 as shown in FIG. 3 may additionally be provided to permit manual control of the valve member 32.

FIG. 6 shows another form of the controller employed in the apparatus of the present invention. In FIG. 6, like numerals are used to denote like parts appearing in FIGS. 1–5. In the controller of FIG. 6, a helically splined portion 60 is provided at the end of a power take-off shaft 16 and one end of a cylindrical member 61 is coaxially mounted on the helically splined portion 60 for spline engagement therewith. In the other end of the cylindrical member 61, there is provided a straight splined bore in coaxial relation with the helically splined bore, and a straight splined portion 63 formed on one end of a driven member 62 is fitted in the straight splined bore for spline engagement therewith. The other end of the driven member 62 is operatively connected with a transmission shaft 14. A resilient member 65 such as a helical spring is interposed between an annular projection or collar 64 on the power take-off shaft 16 and the cylindrical member 61 to normally bias the cylindrical member 61 towards the driven member 62. When now the power take-off shaft 16 is rotated in a direction of arrow 66, the power is transmitted through the power take-off shaft 16, the cylindrical member 61 and the driver member 62 to the transmission shaft 14 to drive the rotary implement. An axial force is derived from the driving power by the helical spline through the cylindrical member 61 and is absorbed by the resilient member 65. Therefore, an amount of displacement of the cylindrical member 61 in a direction of arrow 67 is proportional to the magnitude of the driving power being transmitted. This displacement of the cylindrical member 61 in its axial direction actuates a fork lever 26 abutting the end face of the cylindrical member 61 and is transmitted to a valve member 32 in a control cylinder 31 by a mechanism similar to that employed in the previous embodiment.

From the foregoing description, it will readily be understood that, by arranging in a manner that the valve member 32 is urged to its rotary implement lifting position as shown in FIG. 5 whenever the load exceeds a predetermined value or overload is developed during a tilling operation, the tractor can unobstructedly continue its tilling operation even on a soil of uneven hardness without any possibility of engine stoppage.

It will further be understood that, by suitably adjusting in a manner that the valve member 32 is urged to a position as shown in FIG. 7 at a predetermined load condition, both of the ports 39 and 40 of the control cylinder 31 are closed and there is no flow of fluid into and out of the ram cylinder 36. Under this condition, a constant tilling depth can be maintained unless there is any change in the load. In other words, the inventive apparatus has such unique features that a desired tilling depth can be maintained unless there is any change in the soil resistance and, in an event of development of overload, the tilling depth can automatically be shallowed until the load is reduced to a predetermined value.

Although in the above description, the invention has been described with regard to the specific embodiment in which the controller is mounted on the power take-off shaft, it will be understood that this is only illustrative of one form of the invention, and the controller may be disposed in the gear box on the tractor or may be disposed in the transmission gearing on the rotary implement to attain an entirely similar purpose.

What is claimed is:

1. In an agricultural tractor provided with a rotary implement driven by the power transmitted from the tractor engine through a power take-off shaft, and hydraulically operated means for causing vertical movement of said rotary implement, apparatus for automatically controlling the depth of soil being tilled by said tractor, comprising controller means disposed in the power transmission path from the tractor engine to said rotary implement and operative in response to any variation of the load applied to the power take-off shaft, control valve means for controlling the operation of said hydraulically operated means, and means to transmit the operation of said controller means to said control valve means.

2. Apparatus according to claim 1, in which said controller means comprises a first disc-like member firmly secured on a driving shaft for unitary rotation therewith, a second disc-like member loosely mounted on said drivnig shaft and operatively coupled to a driven shaft for rotation therewith, and a resilient member interposed between said disc-like members for operatively interconnecting said first member with said second member.

3. Apparatus according to claim 1, in which said controller means comprises a driving shaft having a helically splined portion at its power take-off end, a driven shaft having a straight splined portion at an end adjacent said driving shaft, a cylindrical member having splined axial bores spaced from each other for engagement with said splined portions for thereby operatively interconnecting said driving shaft with said driven shaft, and a resilient member mounted on said driving shaft for normally urging said cylindrical member towards said driven shaft.

References Cited by the Examiner
UNITED STATES PATENTS 2,223,002 11/1940 Ferguson _____ 172—7
2,654,301 10/1953 Bohmker _____ 172—2
2,792,065 5/1957 Cole _____ 172—75

ABRAHAM G. STONE, Primary Examiner.

WILLIAM A. SMITH III, Examiner.